No Printed Specification Available
3 Sheets—Sheet 1.
1921X
D. PETTIBONE.
Scythe.
Patented May 5, 1813.
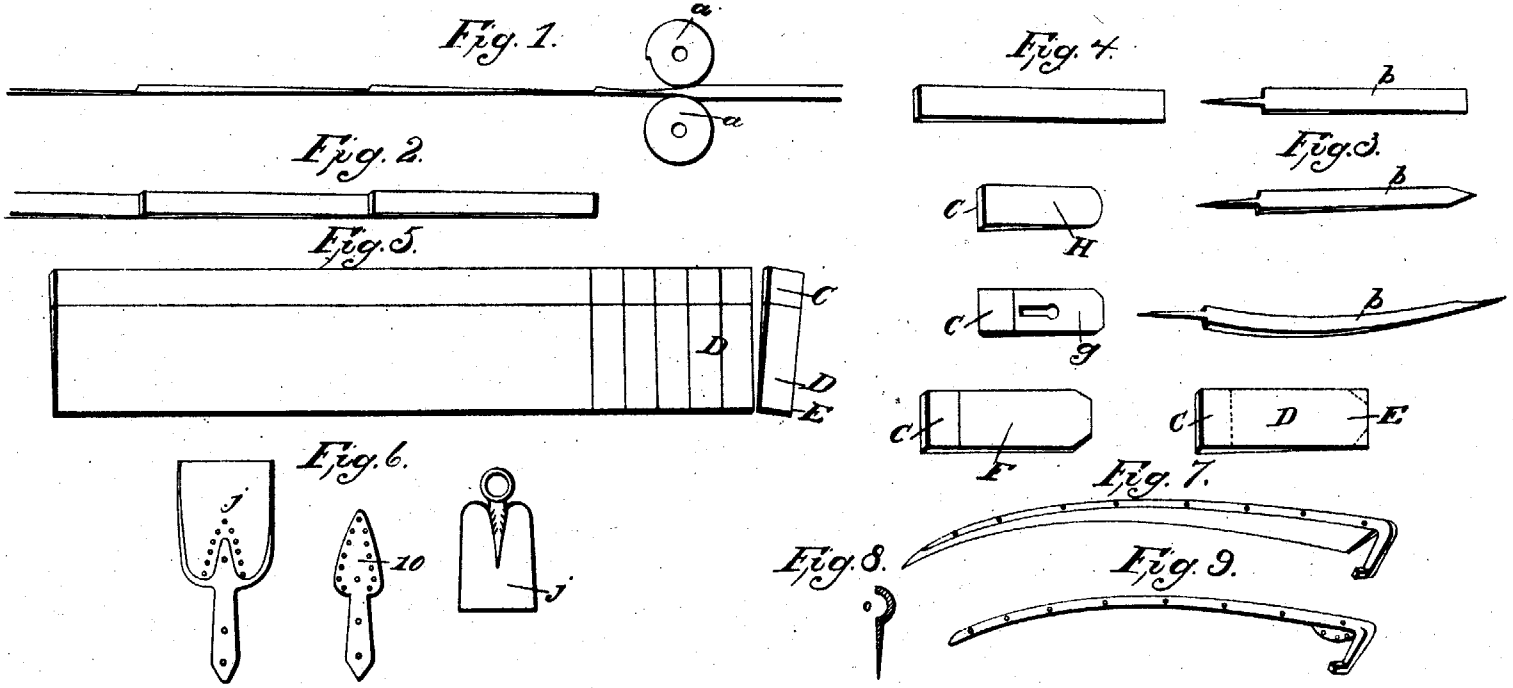

1921X
3 Sheets—Sheet 2.
D. PETTIBONE.
Scythe.
Patented May 5, 1813.
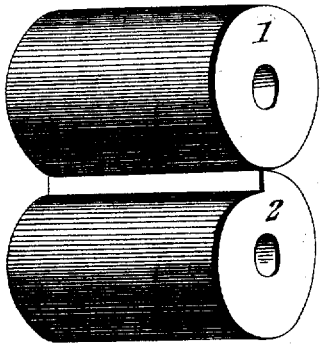
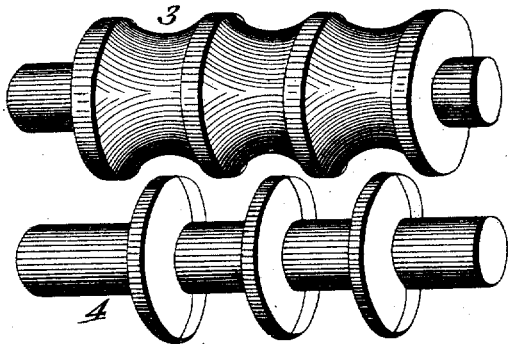
THE NORRIS PETERS CO., PHOTO-LITHO., WASHINGTON, D. C.

1921X
3 Sheets—Sheet 3.
D. PETTIBONE.
Scythe.
Patented May 5, 1813.
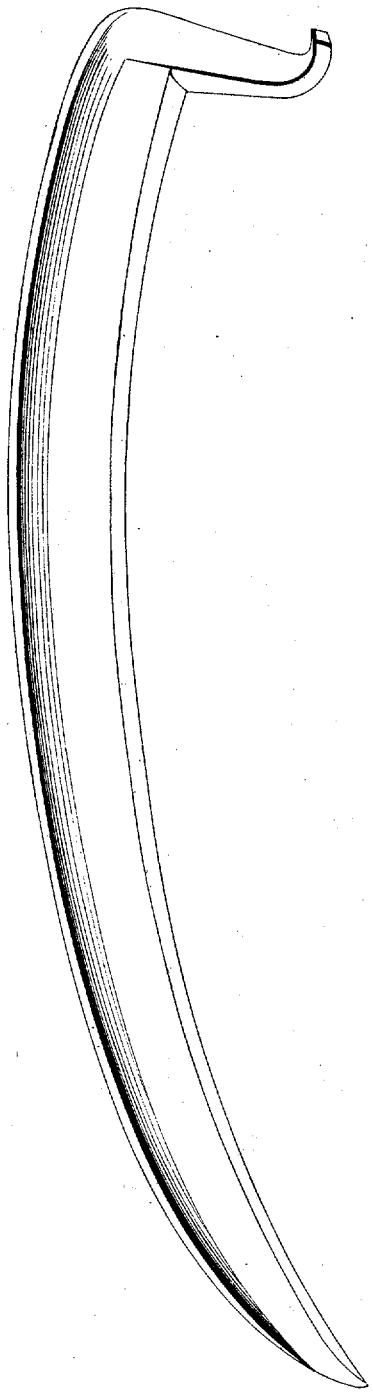
THE NORRIS PETERS CO., PHOTO-LITHO., WASHINGTON, D. C.

1921X

Daniel Pettibone

Specification of a Method of Making Scythes Hayknives and
many other thin plate tools &c discovered by me Daniel Pettibone
as follows Viz. — I weld the best of iron & [illegible] steel together
as usual in the common way. (less iron will be found to answer
the purpose) and then make it to an exact thickness of plate by
means of [illegible] tilt or hand hammer or a rolling mill — except
a small reserve at one end and for the hook or crank: to fasten
it to the handle when the plate is made the back is formed (so as
give it near double the strength) with mould stamps, swages, or any
other method to give impression and form a double back as the
model Daniel Pettibone Witness
Leonard Kennedy
Robert J. Collins jun.
[illegible]

Drawing made

136 [illegible]

(Patented [illegible] May 1813.)